(12) United States Patent
Measels

(10) Patent No.: US 10,678,015 B1
(45) Date of Patent: Jun. 9, 2020

(54) MULTI-TENANT ARCHITECTURE

(71) Applicant: 3-GIS, Decatur, AL (US)

(72) Inventor: Michael Measels, Huntsville, AL (US)

( * ) Notice: Subject to any disclaimer, the term of this patent is extended or adjusted under 35 U.S.C. 154(b) by 0 days.

(21) Appl. No.: 16/210,779

(22) Filed: Dec. 5, 2018

Related U.S. Application Data

(63) Continuation of application No. 15/976,356, filed on May 10, 2018, now abandoned.

(60) Provisional application No. 62/504,101, filed on May 10, 2017.

(51) Int. Cl.
| | |
|---|---|
| *H04B 10/27* | (2013.01) |
| *G02B 6/46* | (2006.01) |
| *G02B 6/44* | (2006.01) |
| *G02B 6/255* | (2006.01) |

(52) U.S. Cl.
CPC ............ *G02B 6/46* (2013.01); *G02B 6/255* (2013.01); *G02B 6/4452* (2013.01); *G02B 6/4453* (2013.01); *G02B 6/4471* (2013.01); *H04B 10/27* (2013.01)

(58) Field of Classification Search
None
See application file for complete search history.

(56) References Cited

U.S. PATENT DOCUMENTS

| | | | | |
|---|---|---|---|---|
| 7,486,860 B2 * | 2/2009 | Bell | ................ | G02B 6/2804 385/140 |
| 7,546,018 B2 * | 6/2009 | Hendrickson | ........ | G02B 6/4441 385/134 |
| 7,751,672 B2 * | 7/2010 | Smith | ................ | G02B 6/4452 385/135 |
| 8,873,565 B2 * | 10/2014 | Fang | ................ | H04L 12/00 370/395.4 |
| 8,914,469 B2 * | 12/2014 | Dawson | ................ | G06Q 10/10 705/80 |
| 8,958,697 B2 * | 2/2015 | Soto | ................ | H04B 10/2503 398/100 |
| 9,009,294 B2 * | 4/2015 | Dawson | ................ | G06F 9/5072 709/224 |
| 10,136,200 B2 * | 11/2018 | Cune | ................ | H04B 10/25754 |

(Continued)

OTHER PUBLICATIONS

D&O Committee: "FTTH Handbook", Feb. 16, 2016, pp. 1-187. (Year: 2016).*

(Continued)

*Primary Examiner* — Li Liu

(57) ABSTRACT

A method for creating a network architecture, wherein network material is allocated for three tiers including future network clients, includes:
a) Establishing active optical equipment within a central office;
b) Connecting the central office to at least one Fiber Distribution Hub with at least one Distribution Cable having multiple fibers;
c) Designating a portion of the multiple fibers of the distribution cable such that fibers are allotted specifically to tier 1 demand, tier 2 demand, and tier 3 future demand;
d) Connecting at least one Fiber Distribution Hub to an intermediate splice closure (ISC) with at least one access fiber (AF) cable having multiple fibers;
e) Splicing multi-port service terminal (MST) cable tails into at least one of the access fiber cables at the intermediate splice closure;
f) Connecting at least one network interface device (NID) to the multi service terminal.

18 Claims, 3 Drawing Sheets

(56) References Cited

U.S. PATENT DOCUMENTS

Figure 1:
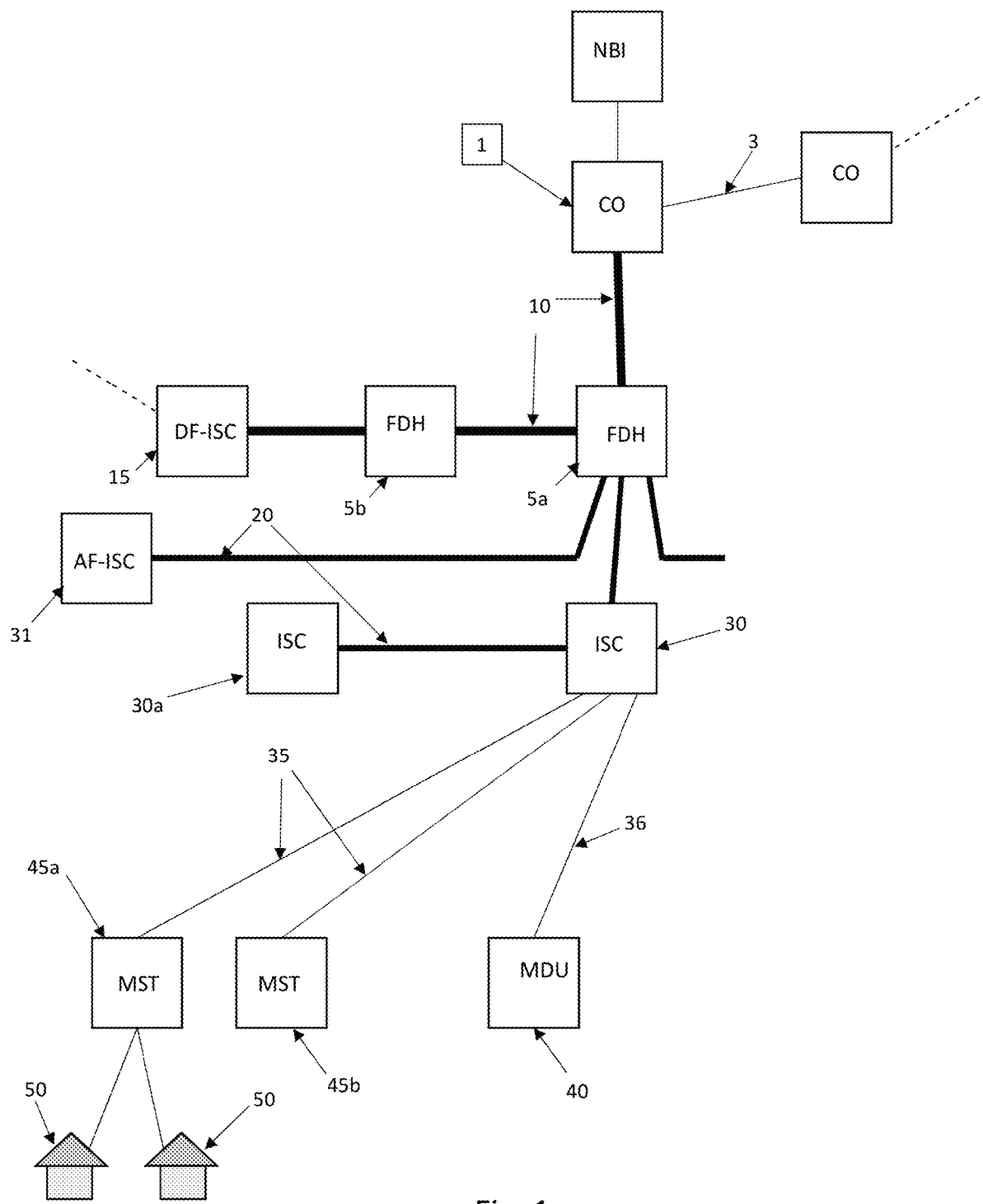

| | | | | |
|---|---|---|---|---|
| 2006/0153517 | A1* | 7/2006 | Reagan | G02B 6/3897 385/135 |
| 2007/0189691 | A1* | 8/2007 | Barth | G02B 6/4452 385/135 |
| 2008/0120677 | A1* | 5/2008 | Bernard | H04Q 11/0067 725/129 |
| 2009/0110359 | A1* | 4/2009 | Smith | G02B 6/4452 385/135 |
| 2011/0091208 | A1* | 4/2011 | Mayor | H04B 10/07 398/38 |
| 2011/0107379 | A1* | 5/2011 | Lajoie | H04L 65/1016 725/87 |
| 2011/0262132 | A1* | 10/2011 | Grindley | H04B 10/272 398/43 |
| 2013/0279914 | A1* | 10/2013 | Brooks | H04Q 11/0067 398/66 |
| 2014/0064731 | A1* | 3/2014 | Conner | H04B 10/27 398/71 |
| 2014/0314412 | A1* | 10/2014 | Soto | H04L 12/2898 398/67 |
| 2015/0012707 | A1* | 1/2015 | Li | H04L 67/34 711/122 |
| 2015/0125146 | A1* | 5/2015 | Erreygers | H04B 10/25 398/58 |
| 2015/0177473 | A1* | 6/2015 | Smith | G02B 6/4457 385/134 |
| 2015/0230008 | A1* | 8/2015 | Elford | H04Q 11/0067 398/66 |
| 2015/0249520 | A1* | 9/2015 | Badar | H04J 14/0245 398/79 |
| 2016/0109036 | A1* | 4/2016 | Elford | F16L 1/028 405/184.1 |
| 2016/0112779 | A1* | 4/2016 | Barnett, Jr. | H04Q 11/0067 398/45 |
| 2016/0269125 | A1* | 9/2016 | Brown | G02B 6/3897 |
| 2017/0150243 | A1* | 5/2017 | Du | H04J 14/0241 |
| 2017/0237492 | A1* | 8/2017 | Mutalik | H04B 10/2503 398/72 |
| 2018/0041404 | A1* | 2/2018 | Singh | H04L 41/5041 |
| 2018/0248644 | A1* | 8/2018 | Gronvall | H04J 14/0246 |
| 2019/0113689 | A1* | 4/2019 | Chappell | G02B 6/3893 |

OTHER PUBLICATIONS

EXFO: "TTTH PON Guide Testing Passive Optical Netwroks", 2012, pp. 1-113. (Year: 2012).*

Al-Quzwini: "Design and Implementation of a Fiber to the Home FTTH Access Network based on GPON", International Journal of Computer Applications, vol. 92, No. 6, Apr. 2014, pp. 30-42. (Year: 2014).*

Farooq et al: "Migration from Copper to Fiber Access Network using Passive Optical Network for Green and Dry Field Areas of Pakistan", International Journal of Soft Computing and Engineering (IJSCE), vol. 5 Issue 4, Sep. 2015, pp. 118-128 (Year: 2015).*

* cited by examiner

| Tier 2 Demand Type | Number of fibers to be allocated |
|---|---|
| VDF | 1 |
| Traffic Controllers | 1 |
| Gas Locations | 1 |
| Sites | 1 |
| Schools | 1 |
| Fiber Needs | 1 |
| AMI Collectors | 2 |
| AMI Routers | 1 |

Fig. 2

MULTI-TENANT ARCHITECTURE

CROSS-REFERENCE TO RELATED APPLICATIONS

This application is a continuation of U.S. Non-provisional application Ser. No. 15/976,356 filed May 10, 2018 which claims the benefit of U.S. Provisional Application No. 62/504,101 filed May 10, 2017.

STATEMENT REGARDING FEDERALLY SPONSORED RESEARCH

Not Applicable

FIELD OF THE INVENTION

This invention relates to a system and architecture for a passive optical network ("PON" throughout).

BACKGROUND OF THE INVENTION

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

During design and engineering of a network the key elements of an architecture are defined. It is important to create a plan and prepare materials and hardware for the desired network. Sometimes this is not done with detail or with a method for additional growth. As described in this application, the inventive architecture for the PON will allocate fiber for Tier 1 (Carrier), Tier 2 (City Owned) and Tier 3 (future) tenants. There is a need for architecture that is efficient and provides for future network requirements. The instant application does this and provides a high-level description of the owner leased FTTH FDH ("Fiber to the home" "Fiber distribution hub") Architecture. It defines the key elements of the architecture that will be used during the design and engineering of the network. The art referred to and/or described within this application is not intended to constitute an admission that any patent, publication or other information referred to herein is "prior art" with respect to this invention. In addition, this section should not be construed to mean that a thorough search has been made or that no other pertinent information as defined in 37 C.F.R. § 1.56(a) exists.

All US patents and applications and all other published documents mentioned anywhere in this application are incorporated herein by reference in their entirety. U.S. Pat. No. 9,930,432 is incorporated herein by reference in its entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well, only for the purposes of complying with 37 C.F.R. 1.72. The abstract is not intended to be used for interpreting the scope of the claims.

BRIEF SUMMARY OF THE INVENTION

In at least one embodiment of the invention, a method and plan for multi-tenant architecture of a passive optical network (PON) is taught. In at least one embodiment the method can comprise:

Having a central office (CO) housing active optical equipment and being connected to at least one Fiber Distribution Hub (FDH) by a DF cable. In some embodiments no more than 6 FDH connect to the Central Office from Distribution fiber cable with 72f each. In some embodiments only 36f will be used for tier 1 and 2 demand. As shown in FIG. 1, in some embodiments there are 9 splitter cassettes wherein each can contain 4×1:4 or 2×1:8 splitters. So, if all 1:4 then max (1:4)*4*9=144 and if all 1:8 then max (1:8)*2*9=144. Thus, as illustrated here, only 144 AF fibres are split at FDH. Additionally, in some embodiments, up to 36 DF may be patched directly through into AF and remaining unsplit. These may be used to serve MDUs and wireless devices.

Connecting additional FDH to the FDH connected to the CO and/or connecting the FDH to at least one Intermediate Splicer Closure (ISC). A DF ISC can used. To serve Multi-Dwelling Units (MDU) of greater than 300 in size, 24f spliced at FDH splice closure can be used. In this embodiments AF cables are a mixture of split and unsplit fibers. Only 3 AF cables leave the FDH and each cable has 72 fibers (6×12f ribbons).

Connecting AF ISC to the FDH can be used when servicing multi-dwelling Units with between 121 and 300 units. Fibers can be patched directly into "grey" fibers in AF and terminate at AF ISC. Grey fibers are not connected to anything downstream but connect upstream and can be for future use MDUs. Fibre access point may have 12f spliced out of DF; 8f used for Multiport Service Terminal (MST); 4f for spare or MDUs. MST tails and DLX cables may be mechanically spliced into the AF and the ISC. DLX cables may only be spliced into "grey" fibres in the AF have been expressed patched at the FDH (i.e. being unsplit).

Connecting MST(s) and/or MDU(s) with 30 or less units to one or more ISC. For MDUs with less than or equal to 120 units a single DLX cable may be left per 30 units. The wireless devices in this FIG. 1 are allocated 2 DLX cables. In the Bill of Quantities (BoQ) the lengths for DXL cables may be included in the MST tail length per data dictionary requirements. The MST may have 1:4 or 1:8 splitters preferred. Both consume if at FDH. If 1:4 splitter is used, a 1:8 is used at the FDH and vice versa. For medium MDU, DLX cable may be left in the pit nearest the edge of the MDU parcel and connection will highly probably be the responsibility of the MDU team.

In some embodiments, the extra step of connecting the end user to the MST and/or MDU. Connectorized single fibre drops into the MST and Network interface unit (NIU) when a service is ordered. The NIU connected when a service is ordered; drop cable plugs into this device.

This document includes architecture for the PON (Passive Optical Network) network. Fiber can be allocated for Tier 1 (Carrier), Tier 2 (City Owned) and Tier 3 (future) tenants, however splicing and connectivity may only be determined for Tiers 1 and 2.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE SEVERAL VIEWS OF THE DRAWING(S)

Figure 3:
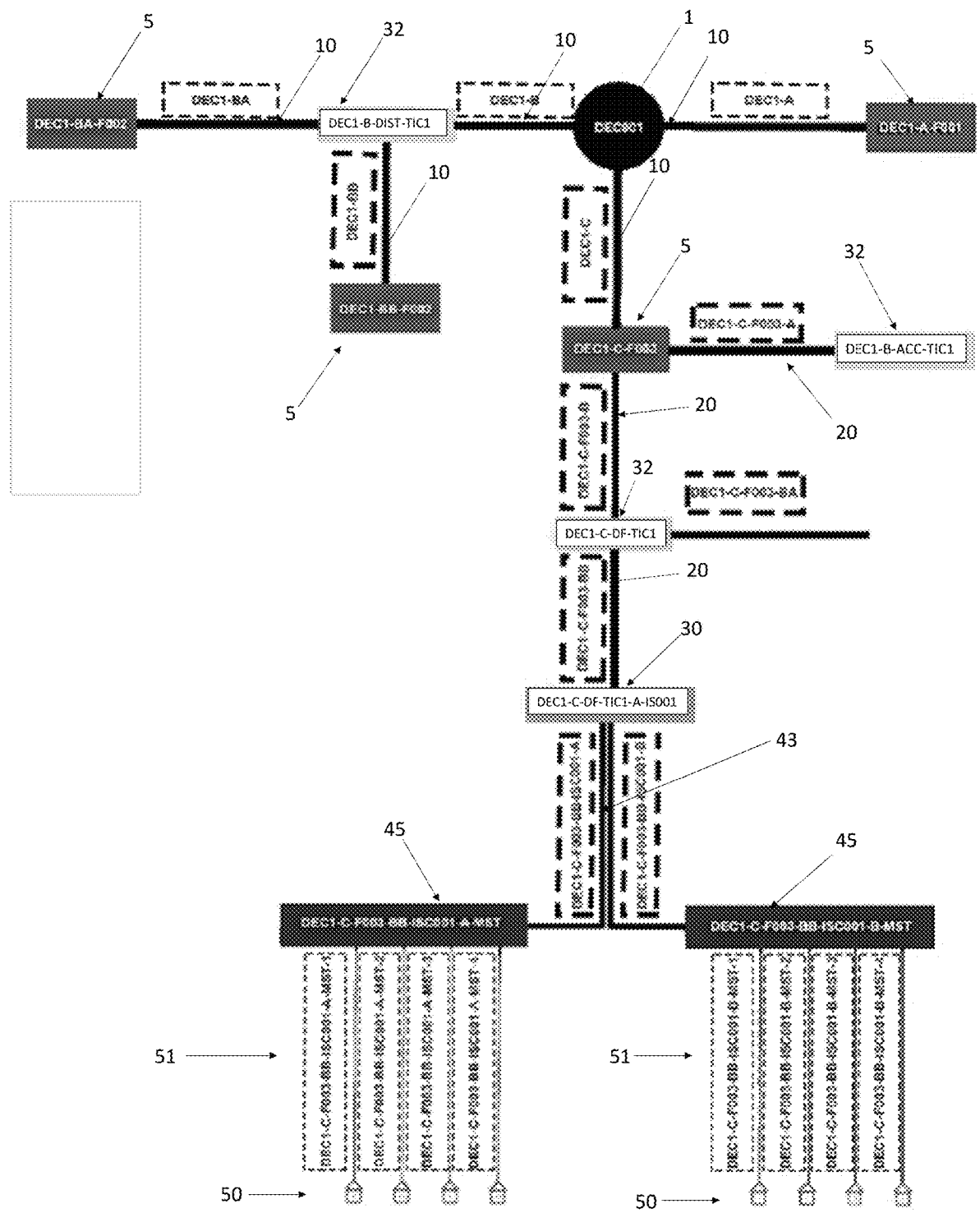

A detailed description of the invention is hereafter described with specific reference being made to the drawing.
FIG. 1 is an architecture topology diagram
FIG. 2 is a table listing allocated fibers for Tier 2 demand
FIG. 3 is a schematic for naming conventions across the architecture

DETAILED DESCRIPTION OF THE INVENTION

While this invention may be embodied in many different forms, there are described in detail within the specification specific preferred embodiments of the invention. This description is an exemplification of the principles of the invention and is not intended to limit the invention to the particular embodiments illustrated.

Described below are additional details of the multi-tenant architecture for a PON architecture. Sizes of cable and designation of small, medium, or large multi-dwelling units may use different values than those given below. For instance in some embodiments a small MDU may be designated as those less than 50 or 100 or 200 or more. This is true for other MDU size designations. Different fibers and/or cables than those detailed may also be used. In some embodiments other naming conventions of the architecture may be used. The embodiments below use some specific language, but there are other embodiments considered that include only some of the described embodied invention below.

Some of the terminology is described below.

Terminology

This section provides a high-level description of the owner leased FTTH FDH ("Fiber to the home" "Fiber distribution hub") Architecture. It defines the key elements of the architecture that will be used during the design and engineering of the network.

1.1 Central Office (CO)

The site connects to the backbone and houses active optical equipment.

1.2 Fiber Distribution Hub (FDH)

Distribution Fiber (DF) cable is run from the Central Office (CO) to the Fiber distribution hub (FDH) which houses splitters. The Fiber distribution hub (FDH) is the first point of splitting in the network.

1.3 Intermediate Splice Closure (ISC)

The Intermediate Splice Closure (ISC) is a splice location where multi-port service terminal (MST) cable tails are spliced into the AF cables.

1.4 Multiport Service Terminal (MST)

A Multiport Service Terminal (MST) is a connectorized terminal with 4 or 8 ports. Preconnectorised drops are connected to the Multiport Service Terminal (MST) when a service is ordered.

1.5 Network Interface Device (NID)

When a service is ordered, this device will be installed and a drop connected between it and the premises' assigned MST.

1.6 Tie in Case

The TIC is a splice closure where a cable is spliced into between 1 and 3 new cables of the same tier. The design will include either an AF-TIC (Access Fiber Termination Interconnect Cabinet) or a DF-TIC (Distribution Fiber Termination Interconnect Cabinet) depending on what tier of cable is being spliced (AF or DF).

1.7 Fiber Distribution Hub (FDH) Splice

The splice closures where Distribution Fiber (DF) and AF are spliced into the tail leaving the FDH. The design will include both AF and Distribution Fiber (DF) Fiber distribution hub (FDH) splices, one each per FDH.

1.8 Network Element

Pieces of fiber equipment which are necessary to provide connectivity between the Central Office (CO) and the Network Interface Device (NID) (cables, splitters, splice closures, slack).

1.9 Physical Element

Pieces of equipment of that house Network Elements and are necessary for the installation of the network (pedestals, conduit, vaults, cabinets, strands, poles, guys, anchors, slack).

1.10 Upstream/Downstream

The Central Office (CO) is considered the highest tier Network Element. All other network elements are downstream of this point in the network, and all Network Elements are considered upstream of the NID. If Network Element A is closer to the Central Office (CO) than Network Element B, Network Element A is considered to be upstream of B. Similarly, B is downstream of A.

1.11 Hub Joint

A Network Element which demarcates the boundary between 2 tiers. These joints are the only Network Elements with cables from multiple tiers.

Note: cable downstream from a Hub Joint can be the same category as upstream, however there must also be downstream cable which is different to the upstream. For example, an Intermediate Splice Closure (ISC) is a Hub Joint where AF cable is spliced into Multiport Service Terminal (MST) tails as well as another AF cable.

1.12 Intermediate Joint

A Network Element which is used to connect a cable with 1 or more cables from the same network tier (typically by splicing), for example an AF-TIC or DF-TIC.

1.13 Single Demand

Any customer requiring a single split fiber will be represented as a single demand point. These demand points will always be served via an MST, where the fiber has been split at the Fiber distribution hub (FDH) (1:4 or 1:8) and the Multiport Service Terminal (MST) (1:8 or 1:4).

1.14 Aggregated Demand

Some locations or groups customers (e.g apartment blocks) will be served by placing unsplit fibers at the property line of the premises, with the fiber being split as required on the premise. These locations or groups of customers will be represented as one or more aggregated demand points, where each demand point will require a single unsplit fiber. This fiber will pass through the Fiber distribution hub (FDH) cabinet, but bypass the splitters.

1.15 Flat Drop
   Flat Drop is defined by 2 Fiber Drop and/or Tail from MST.
1.16 Fiber Distribution Hub (FDH) Area
   A polygon containing all of the demand served by a Fiber distribution hub (FDH) cabinet, as well as the equipment downstream of the cabinet used to serve this demand.
1.17 Route Edge
   The unique path between 2 adjacent points containing a physical element. All pieces of conduit or strand lie along a route edge in a one to one relationship. Cables can span multiple route edges.
1.18 Lit Fiber
   Fiber that has an optical path back to an OLT (Optical Line terminal) port at the CO.
1.11 Dead Fiber
   Fiber that has no optical path back to an Optical Line terminal (OLT) port at the CO.
1.20 Assigned Fiber
   Fiber that has an optical path back to an Optical Line terminal (OLT) port at the CO, as well as an NIU (network interface unit) or NDP.
1.21 Spare Fiber
   Fiber that has an optical path back to an Optical Line terminal (OLT) port at the CO, as well as an NIU (network interface unit) or NDP.
1.22 Candidate Network
   The candidate network consists of all potential route edges and nodes in the network. For potential route edges, this includes all paths through rear easements, along city ROW and aerial strand. For potential nodes, this includes all useable poles as well as any potential pedestal and vault location.
1.23 Owner Leased Architecture In FIG. 1, the central office 1 houses active optical equipment and connects to the backbone 3. As shown, the Central Office (CO) 1 is connected to a fiber distribution housing (FDH) 5a via a distribution fiber cable (DF) 10. Multiple other FDHs 5 could be connected to the CO 1. Using a 432fiber DF cable it is designed that a maximum of six FDHs 5 can be run from the CO if each 432 cable is split into 6 portions of 72 fibers apiece. In some embodiments only 36 fibers from the 72 fibers of each portion is used for tier 1 and tier 2 demand. This leaves 36 fibers in each portion to be used for tier 3 purposes.

As shown, the FDH 5a is connected to the CO 1 by the DF cable 10. In the embodied design shown, the DF cable 10 is split into no more than 144 fibers at each FDH 5 as 36 fibers are split at each FDH. Though more or less splitter cassettes can be used to split the fibers, in this embodiment 9 splitter cassettes are used in each FDH. Each cassette can contain 4×1:4 splitters or 2×1:8 splitters. If all are 1:4 splitters then the maximum splits is 144 as there are 4 splitters in each of the 9 cassettes (4*9=36 across 1:4 splitters; thus 36:144). Similarly, if all are 1:8 splitters, again the maximum splits is 144 as there are 2 splitters in each of the 9 cassettes (2*9=18 across 1:8 splitters; thus 18:144).

AF cables 20 then can extend from the FDH 5a. In some embodiments, up to 36 DF fibers can be patched directly through into an AF cable 20 remaining unsplit. These unsplit fibers can be used to serve MDUs and wireless devices. The AF cables 20 will generally be a mixture of split and unsplit fibers. No more that 3 AF cables 20 can leave a FDH 5a, and each cable has 72 fibers (6×12f ribbons).

In some embodiments as shown, an AF cable 20 can extend to an intermediate splice closure (ISC) 30 where multi-port service terminal (MST) cable tails 35 and DLX cables 36 are spliced into the AF cable 20. In some designs the DLX cables 36 will only be spliced into "grey" fibers (these are fibers connected upstream but not connected downstream; generally for future use/MDUs) in the AF 20 that have been expressed patched (i.e. are unsplit) at the FDH 5a. For multi dwelling units (MDU) 40 with less than or equal to 120 units, a single DLX cable is left per 30 units. Wireless devices can often be allocated two DLX cables 36.

For the multiport service terminal (MST) 45a/b, in some embodiments a 1:8 splitter is preferred. For medium MDU 40 the DLX cable can be left in the pit nearest the edge of the MDU parcel. Connection can be the responsibility of the MDU team.

When service is ordered, the Network Interface device (NID) 50 can be installed and a drop fiber connects the NID 50 and the premises' assigned MST 45a.

In some embodiments as shown, an AF cable 20 connects one ISC 30 with another ISC 30a in order to connect additional MST cable tails to an additional AF cable 20.

In some embodiments as shown, an AF cable 20 can extend from the FDH 5a to an AF ISC 31. This is for the purpose of serving large MDUs with between 121 and 300 units. In this embodied architecture, fibers are patched directly into "grey" fibers in the AF cable 20 and terminate at the AF Intermediate Splice Closure 31.

In some embodiments as shown, a DF cable 10 can also connect one FDH 5a to another FDH 5b. Large MDUs having more than 300 units are serviced through this design. Here 24 fibers are spliced at the splice closure 15. It is noted here that the use of DF NAPs reduces the number of FDHs that can be supported on a 432 fiber DF cable.

As described herein, there is a general maximum distance between the Central Office (CO) and the Network Interface Device (NID) of 18 km in some embodiments.

The network as designed can assign fiber to a property based on its demand category.

Tier 1 demand are elements associated with Qualifying Addresses (as defined in the Fiber Network Agreement). These include 1) Single Family Units (SFU), 2) Multi Dwelling Unit (MDU), and Home Owners Associations (HOA). These are described below.

A single family unit can be a property which will generally only require a single service. Though in some embodiments multiple service can be used.

A mufti unit can be a property which has multiple customers requiring a service. This could include cases where a small number of customers exist within the same land parcel (e.g a duplex, triplex), as well as large single structures like an apartment block. In each case, the demand for a property will be assigned to single point within the land parcel that contains it.

A Small Multi Dwelling Unit (S-MDU) can be a property requiring 2-8 services. These properties can be served in the same way as a Single Family Units (SFU) (for example via drops from an Multiport Service Terminal (MST) of the appropriate size, with the drops installed when a service is ordered).

A Medium Multi Dwelling Unit (M-MDU) can be a property requiring 9-120 services. M-MDUs can receive 1 unsplit AF fiber per 30 units. Each of these fibers can be run from an Intermediate Splice Closure (ISC) in a single DLX cable where the strand itself can be patched directly through one of the available ports for direct feed in the Fiber distribution hub (FDH) cabinet (i.e unsplit fiber).

A Large Multi Dwelling Unit (L-MDU) can be a property with more than 120 services. L-MDUs can have a protected AF cable left in the Pit nearest to the property, with a 12f buffer per 360 premises.

A Homeowners Association (HOA) can be identified as part of the scoping process for any new market. When a Homeowners Associations (HOA) is identified, a polygon can be drawn which surrounds all of the address points that are part of the Homeowners Associations (HOA). The polygon can be used to exclude any addresses from the standard Homeowners Associations (HOA) build. Associated with this polygon can be a 'meet me' point that can have an attribute used to determine how much fiber to allocate to the Homeowners Associations (HOA), with the fiber cable designed up to this point.

In Tier 2 demand owner identified facilities are to be served outside of an agreement with the Tier 1 Tenant: VDF (video distribution frame), Traffic Controllers, Electric Locations, Gas Locations, Sites, Schools, Fiber Needs, AMI (Advanced metering infrastructure) Collectors, Advanced metering infrastructure (AMI) Routers. These facilities can each receive fiber direct from an Owner Optical Line terminal (OLT), where bandwidth can be determined. An example of the number of fibers to be allocated is illustrated in the table of FIG. 2. As illustrated in this embodiment, these fibers cannot be split. The design can design fiber all the way to the point location provided in the input data.

Tier 3 demand can refer to any demand which may be served by future tenants of the owner dark fiber network. It may or may not include addresses associated with the Tier 1 demand, and its significance in this design is how it drives the sparing of fiber in the network.

A naming convention provides Network and Physical Elements in the design to be identified with a unique code or name. Either a Common Language Location Identifier (CLLI) or Common Language Equipment Identifier (CLEI) which contains information about the type of element, as well as their position in the network.

FIG. 3 provides a schematic that outlines naming conventions across the architecture.

Structures can have a unique CLLI code of the form:
C[CO Number]–[FDH Number]–[Structure type code]+[3 digit code]
For example a Splice Vault downstream from Central Office (CO) number 2, Fiber distribution hub (FDH) cabinet 4 may have a CLLI of C2-F4-SV010
The source of each code and number are described below:
   CO Number: Each Central Office (CO) point can be given a number between 1 and 6
   DF Leg: A letter from 'A' to 'Z', where each discrete Distribution Fiber (DF) cable can be given a unique label, with additional letters added to Distribution Fiber (DF) emerging from a TIC beginning at 'A'.
   FDH Number: Each Fiber distribution hub (FDH) Cabinet within each Central Office (CO) area can be given a number between 1 and N where N is the number of FDHs in Central Office (CO) area. For example if there are 4 Fiber distribution hub (FDH) Cabinets required to serve premises in Central Office (CO) area 2, every structure CLLI will begin with either C2-P1, C2-P2, C2-P3, C2-P4, where the Fiber distribution hub (FDH) number is the number of the Fiber distribution hub (FDH) upstream of the structure.
   Structure type code
      PED=Pedestal
      MV=Medium Vault
      LV=Large Vault Fiber cables can be identified according to their CLEI attribute.

Cable CLEI change with splicing. For example, if a Distribution Fiber (DF) cable in C1 leaves Fiber distribution hub (FDH) cabinet number 3 (which is on Distribution Fiber (DF) leg A) the cable name can initially be C1-A-P3-A. If it hits a TIC and is branched into 2 cables, these cables can be named C1-A-P3-AA and C1-A-P3-AB.

C[CO Number]-P[FDH Number]–[DF leg][secondary Distribution Fiber (DF) leg][ . . . ]–ISC[ISC Number]–[MST Number]–[Drop Number]

Splice closures will be identified according to their CLEI attribute. Splice closure CLEI are simply the highest terminating cables CLEI followed by the DEVICE_ELEMENT attribute of the enclosure.

[Terminating cable name]–[Enclosure type]

Fiber equipment can be identified according to their CLEI attribute. These attributes can be the CLEI of the terminating cable, followed by the equipment type (MST, NIU, NDP, Splitter, OLT, Patch panel).

Conduit can be identified according to their CLEI attribute. These attributes can be the concatenation of the CLLI of thee two Structures that this conduit runs between, as well as the number of the conduit.

[CLLI of Structure 1]–[CLLI of Structure 2]–[Conduit Number]

Slack loops can be an essential part of any fiber optic system. These GIS point features represent coils or extra cable at a specific location. These coils can be very useful for repairing a cable when it has been damaged or for connecting new fiber optic cables to the network. Slack loops can be identified according to their CLEI attribute. These attributes can be the concatenation of the CLEI of the loops cable, followed by the Loop Number. The loop number can be 0 for the source slack at the start of the cable and increase by 1 until the sink slack loop.

[Cable name]+[Loop Number]

Demand can be identified according to their CLEI attribute. This attribute can be the CLEI of the terminating cable, followed by the demand type.

As shown in FIG. 3, the CO 1 is identified as DEC001. DEC here can simply be an identification of the overall system, architecture, and/or client (e.g. individual, corporation, government, etc.). Here the CO portion is identified as 001 and has DF lines 10 identified as DEC1-A, DEC1-B. and DEC1-C; each line 10 given an identifying letter. These lines 10 extend to FDHs 5 and a TIC 32 and have identifiers DEC1-A-F001, DEC1-C-F003, and DEC1-B-DIST-TIC1. DEC1-B-DIST-TIC1 as shown is the only TIC splice closure directly connected to the CO 1 through a DF line 10. From DEC1-B-DIST-TIC1 the DF line DEC1-B is distributed into DF lines DEC1-BA and DEC1-BB, thus differentiated from one another with the additional letter A as opposed to B. DEC1-BA leads to FDH 5 having an identifier DEC1-BA-F002 and DEC1-BB leads to FDH 5 having an identifier DEC1-BB-F002.

DEC1-A and DEC1-C extend to FDHs 5 as identified with DEC1-A-F001 and DEC1-C-F003. The FDH 5 identified with DEC1-C-F003 has two AF lines 20 extended therefrom, DEC1-C-F003-A and DEC1-C-F003-B, and extending respectively to two TICs 32 (DEC1-B-ACC-TIC1) and (DEC1-C-DF-TIC1).

TIC 32 (DEC1-C-DF-TIC1) F003 has two AF lines 20 extended therefrom, DEC1-C-F003-BA and DEC1-C-F003-BB which extends to ISC 30 (DEC1-C-DF-TIC1-A-ISC001). This ISC 30 is connected to line A and is the only ISC at this level and is thus designated 001. ISC 30 as shown has two MST lines 43 extending therefrom, DEC1-C-F003-BB-ISC001-A and DEC1-C-F003-BB-ISC001-B, and extending respectively to MSTs 45 DEC1-C-F003-BB-ISC001-A-MST and DEC1-C-F003-BB-ISC001-B-MST. It is here that drop lines 51 are sent to multiple users over lines DEC1-C-F003-BB-ISC001-A-MST (with additional identifiers 1-4) and DEC1-C-F003-BB-ISC001-B-MST (with additional identifiers 1-4). These drop lines can be connected to a network interface device 50.

For the purposes of this disclosure, like reference numerals in the figures shall refer to like features unless otherwise indicated.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for creating a network architecture wherein network material is allocated for three tiers including future network clients, the method including:
   a) Establish active optical equipment within a central office;
   b) Connecting the central office to at least one Fiber Distribution Flub with at least one Distribution Cable having multiple fibers;
   c) Designating a portion of the multiple fibers of the distribution cable such that fibers are allotted specifically to tier 1 demand, tier 2 demand, and tier 3 future demand;
   d) Connecting at least one Fiber Distribution Hub to an intermediate splice closure (ISC) with at least one access fiber (AF) cable having multiple fibers;
   e) Splicing multi-port service terminal (MST) cable tails into at least one of the access fiber cables at the intermediate splice closure;
   f) Connecting at least one network interface device (NID) to the multi service terminal.

2. The method of claim 1 wherein up to 6 fiber distribution hubs are connected to the central office.

3. The method of claim 2 wherein each distribution cable has 72 fibers and 36 fibers are used for tier 1 demand and tier 2 demand, and 36 fibers are designated for future tier 3 demand.

4. The method of claim 1 having 9 splitter cassettes wherein the splitter cassettes include splitters selected from the group consisting of 1:4 splitters, 1:8 splitters, and any combination thereof.

5. The method of claim 1 having 9 splitter cassettes wherein the distribution fiber cable is split into up to 144 fibers at the fiber distribution hub.

6. The method of claim 1 wherein up 36 fibers of the at least one distribution fiber cable can remain unsplit and be patched into the access fiber cable at the fiber distribution hub.

7. The method of claim 1 wherein the at least one fiber distribution hub can connect to a second fiber distribution hub through a distribution fiber cable.

8. The method of claim 7 wherein a distribution fiber cable connects the second fiber distribution huh to a distribution fiber cable intermediate splice closure for serving at least one multi-dwelling unit of greater than around 300 service tenants.

9. The method of claim 1 wherein an access fiber intermediate splice closure is connected to a Fiber Distribution Huh with at least one access fiber (AF) cable having multiple fibers, the access fiber intermediate splice closure designed to serve future multi dwelling units with between about 121 and 300 units.

10. The method of claim 9 wherein fibers arc patched directly into gray fibers of the access fiber cable and terminate at the access fiber intermediate splice closure.

11. The method of claim 1 wherein 2 to 30 fiber distribution hubs are connected to the central office and multiple fiber distribution hubs are connected to one or more other fiber distribution hubs.

12. The method of claim 1 wherein half or more distribution fibers from the central office are for future tier 3 use.

13. The method of claim 1 wherein access fiber cables are a mixture of split and unsplit fibers and up to three access fiber cables are distributed from the fiber distribution hub.

14. The method of claim 1 wherein multi-port service terminal (MST) cable tails and DLX cables are spliced into at least one of the access fiber cables at the intermediate splice closure, the DLX cables will only be spliced into those fibers of the AF cable designated for future use and unsplit at the fiber distribution hub.

15. The method of claim 1 wherein one DLX cable is left per 30 units for multi dwelling units with less than or equal to 120 units.

16. A method for creating a network architecture wherein network material is allocated for three tiers including future network clients, the method including:
   a) Establishing active optical equipment within a central office;
   b) Connecting the central office to at least one Fiber Distribution Hub with at least one Distribution Cable having multiple fibers;
   c) Designating a portion of the multiple fibers of the distribution cable such that fibers are allotted specifically to tier 1 demand, tier 2 demand, and tier 3 future demand;
   d) Connecting the at least one Fiber Distribution Hub to a second fiber distribution hub through a distribution fiber cable intermediate splice closure (ISC) with at least one access fiber (AF) cable having multiple fibers, the second fiber distribution hub further connected to a distribution fiber cable intermediate splice closure (DF ISC) for serving at least one multi-dwelling unit of greater than around 300 service tenants;

e) Connecting the at least one Fiber Distribution Huh to an access fiber intermediate splice closure with at least one access fiber (AF) cable having multiple fibers, the access fiber intermediate splice closure designed to serve future multi dwelling units with between about 121 and 300 units;

f) Connecting from the central office one of the at least one Fiber Distribution Hub to an intermediate splice closure (ISC) with at least one access fiber (AF) cable having multiple fibers;

g) Splicing multi-port service terminal (MST) cable tails into at least one of the access fiber cables at the intermediate splice closure;

h) Connecting at least one network interface device (NID) to the multi service terminal.

17. A method for creating a network architecture wherein network material is allocated for three tiers including future network clients, the method including:

a) Establish active optical equipment within a central office;

b) Connecting the central office to at least one Fiber Distribution Hub with at least one Distribution Cable having multiple fibers;

c) Designating a portion of the multiple fibers of the distribution cable such that fibers are allotted specifically to tier 1 demand, tier 2 demand, and tier 3 future demand; tier 1 demand comprising Single Family Units (SFU), 2) Multi Dwelling Unit (MDU), and Home Owners Associations (HOA) and tier 2 demand comprising VDF (video distribution frame), Traffic Controllers, Electric Locations, Gas Locations, Sites, Schools, Fiber Needs, AMI (Advanced metering infrastructure) Collectors, Advanced metering infrastructure (AMI) Routers and tier 3 comprising future demand;

d) Connecting at least one Fiber Distribution Huh to an intermediate splice closure (ISC) with at least one access fiber (AF) cable having multiple fibers;

e) Splicing multi-port service terminal (MST) cable tails into at least one of the access fiber cables at the intermediate splice closure:

f) Connecting at least one network interface device (NID) to the multi service terminal.

18. The method of claim 17 wherein about half of the multiple fibers of the distribution cable are allotted specifically to tier 3 future demand.

* * * * *